United States Patent
Minami et al.

[11] Patent Number: 6,028,661
[45] Date of Patent: Feb. 22, 2000

[54] MULTI-BRANCHED OPTICAL LINE TESTING APPARATUS

[75] Inventors: Takao Minami; Nobuaki Takeuchi, both of Tokyo; Naoyuki Nozaki, Osaka; Koichi Shinozaki, Osaka; Takamu Genji, Osaka, all of Japan

[73] Assignees: Ando Electric Co., Ltd., Tokyo; The Kansai Electric Power Co., Inc., Osaka, both of Japan

[21] Appl. No.: 08/986,733

[22] Filed: Dec. 8, 1997

[51] Int. Cl.[7] .................................................. G01N 21/00
[52] U.S. Cl. ............................................. 356/73.1; 385/24
[58] Field of Search ............................ 356/73.1, 43, 44, 356/301, 432, 128; 374/131; 385/24; 250/227.23

[56] References Cited

U.S. PATENT DOCUMENTS

| | | | |
|---|---|---|---|
| 5,028,146 | 7/1991 | Wada | 374/131 |
| 5,187,362 | 2/1993 | Keeble | 356/73.1 |
| 5,396,569 | 3/1995 | Yanagawa et al. | 385/24 |
| 5,793,481 | 8/1998 | Leali | 356/73.1 |

*Primary Examiner*—Frank G. Font
*Assistant Examiner*—Tu T. Nguyen
*Attorney, Agent, or Firm*—Fish & Richardson P.C.

[57] ABSTRACT

A multi-branched optical line testing apparatus can automatically detect a faulty line in multi-branched optical lines and the distance to the fault point. An optical pulse is introduced to the branch point of optical fibers and is reflected inside the respective optical fibers. The waveform of the returning response light is analyzed by an optical time-domain reflectometer (OTDR) measuring apparatus to detect a fault in the respective optical fibers and to determine the fault point. The OTDR measuring apparatus periodically converts the response light which is returned from the respective optical fibers into a digital waveform data group, calculates the attenuation ratios of the respective optical fibers by performing separation analysis of the digital waveform data group, and determines the faulty line and the position of the fault point based on the change of the attenuation ratio of the respective optical fibers.

5 Claims, 8 Drawing Sheets

CP1 : COUPLER
CN1~CN5 : OPTICAL CONNECTOR
FB1~FB4 : OPTICAL FIBER

DISTANCE

| VALUE OF THE ATTENUATION RATIO R | NUMBER OF DIGITS REQUIRED OF DATA X | NECESSARY NUMBER OF DIGITS TO BE CALCULATED |
|---|---|---|
| 10 | 8 | 16 |
| 100 | 10 | 20 |
| 1000 | 12 | 24 |
| 10000 | 14 | 28 |

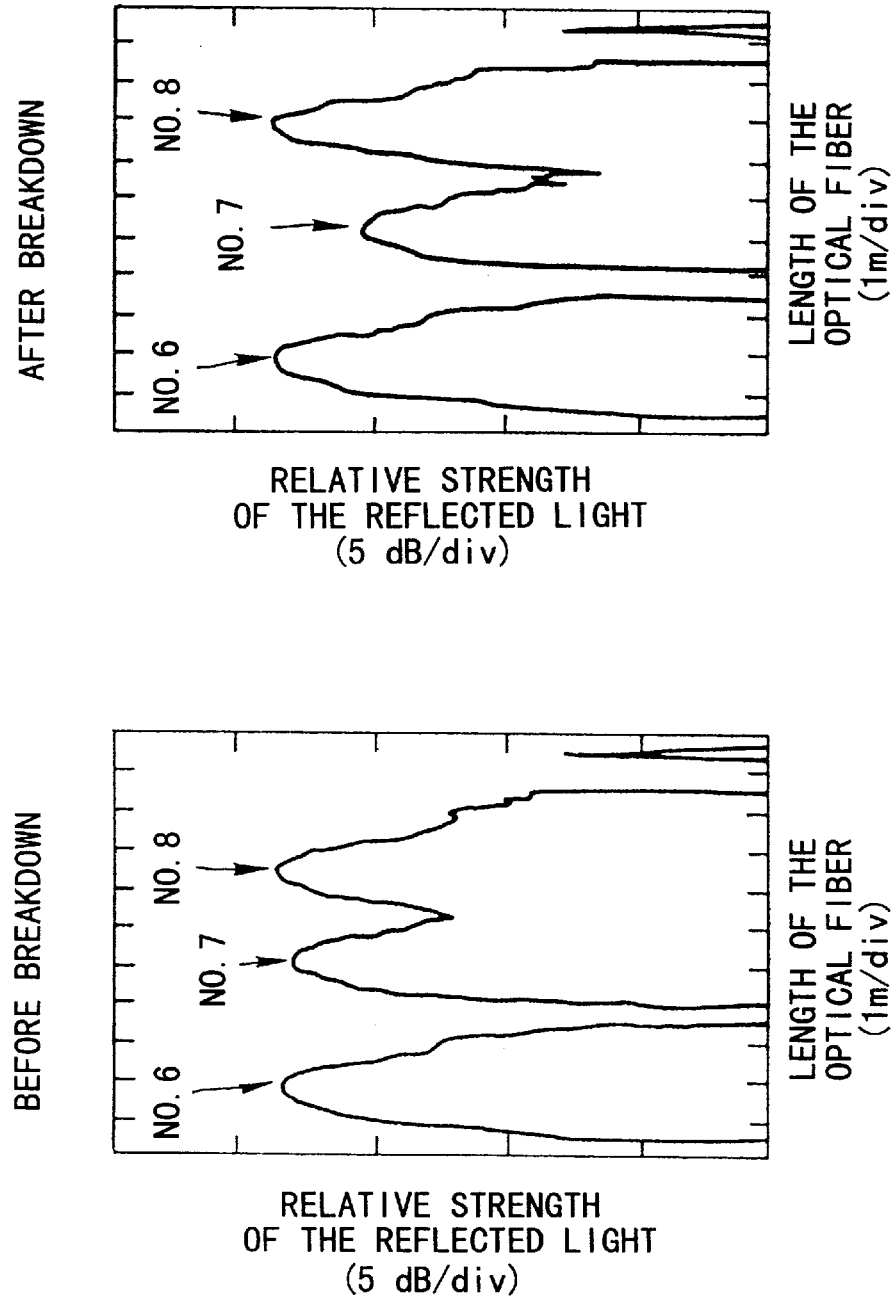

MULTI-BRANCHED OPTICAL LINE TESTING APPARATUS

BACKGROUND OF THE INVENTION

1. Field of the Invention

The present invention relates to a multi-branched optical line testing apparatus for determining a faulty line in multi-branched optical lines and for determining the distance to the fault point on the faulty line.

2. Description of the Prior Art

Data, voice data, image data and the like which are handled by a computer are now digitized and communicated via various communication media such as cable and the like.

Taking an example of computer communication for example, only the transfer of data having a relatively small quantity of information, such as character information, compressed static images or the like has been conventionally performed, due to the processing capacity of computers, the low throughput of transfer media and the like.

Recently, the processing speed of computers is rapidly increasing, and there has been a demand for transferring motion picture data using computers. The data quantity in a motion picture becomes larger than that in character information, static images or the like. Furthermore, in order to display a motion picture smoothly on the side receiving the motion picture data, there is a restriction on the time that it is necessary to receive the data constituting the motion picture for each set time period.

If there is such a restriction, then when motion picture data is transferred via a telephone line as in the past, acceptable motion picture data cannot be obtained on the side receiving the motion picture data.

Therefore, optical fibers have been recently used as a transfer medium which can transfer large volumes of data per hour. When an optical fiber is used, it is necessary to check the line condition at the time of laying the optical fiber and to maintain it regularly.

As a apparatus for this maintenance, there have been developed various apparatuses for the detection of problems in the optical fiber, based on the backscattering light produced upon incidence of an optical pulse with the optical fiber. These apparatuses can be used also in multi-branched optical lines in which a single optical fiber is branched by a light-branching apparatus or the like. When such apparatuses measure the multi-branched optical line, it is necessary to provide a filter which reflects a test light to each branched optical line.

Briefly explaining the outline of such a apparatus, an optical pulse serving as a test light is projected into an optical fiber to be measured. The backscattering light produced in the optical fiber is then detected in time series, and this operation is regularly repeated to obtain a measurement result for one time. This measurement result is then stored, and the measurement result obtained by the next measurement is compared with that of the previous measurement. If there is any difference between these measurement results, it is determined that there is a problem in the optical fiber line.

The above-mentioned conventional multi-branched optical line testing apparatus can detect faults in optical lines, but cannot detect in which position the fault exists in the faulty line. Moreover, with the conventional multi-branched optical line testing apparatus, since each of the reflected lights observed using an OTDR (Optical Time-domain Reflectometer) measuring apparatus must not be overlapped on each other on a time axis, the arrangement position of each filter must be determined so that the distances from a coupler differ mutually. To that end, the optical fiber must be reasonably long. Using such a long optical fiber however, makes the cost of the transfer system very high, making it difficult to make this practicable.

SUMMARY OF THE INVENTION

In view of the above, it is an object of the present invention to provide a multi-branched optical line testing apparatus which can automatically detect a faulty line in multi-branched optical lines and the distance to the fault point.

In order to solve the problems described above, the present invention is a multi-branched optical line testing apparatus which introduces an optical pulse into a branch point of a multi-branched optical line, and analyzes a waveform of a response light which is advanced from said branch point to a plurality of optical lines, reflected in these optical lines and returned via said brand point, to thereby detect a fault in each optical line, and determine the fault point, and is characterized in that said response light which is returned via said branch point for each predetermined period of time is converted to a digital waveform data group, an attenuation ratio of each optical line is calculated by performing separation analysis of said digital waveform data group, and the faulty line and the position of the fault point are determined based on the change of the attenuation ratio.

According to the multi-branched optical line testing apparatus of the present invention, a faulty line generated in multi-branched optical lines and a position of the fault point can be automatically measured. Therefore, it is possible to effectively perform the measurement without arranging filters at different intervals for every line at the time of measuring a faulty line, as in the conventional apparatus. Furthermore, with this multi-branched optical line testing apparatus, measurement is performed with good reproducibility, hence it is possible to perform reliable measurement with high objectivity, compared to measurement performed by a person.

Moreover, the present invention is a multi-branched optical line testing apparatus which introduces an optical pulse into a branch point of a multi-branched optical line, and analyzes a waveform of a response light which is advanced from said branch point to a plurality of optical lines, reflected in these optical lines and returned via said brand point, to thereby detect a fault in each optical line, and determine the fault point, and is characterized in that said response light which is returned via said branch point for each predetermined period of time is converted to a digital waveform data group, an equation group comprising terms obtained by multiplying each data constituting said digital waveform data group by autoregressive coefficients, that is, simultaneous equations patterning the autocorrelation relationship between each data is prepared, each autoregressive coefficient is calculated by solving these simultaneous equations using a least squares approximation method, the attenuation ratio of each optical line connected to said branch point is calculated based on this autoregressive coefficient, and the faulty line and the position of the fault point are determined based on the change of the attenuation ratio.

Furthermore, the present invention is characterized in that when the number of optical fibers connected to said branch point is designated as k, said digital waveform data group is divided into (k+1) equal parts, and simultaneous equations corresponding to a large attenuation ratio of N/(k+1) times are set up.

Moreover, the present invention is characterized in that said attenuation ratio is calculated by solving the k-th degree polynomial equation designating said each autoregressive coefficient as a coefficient of each term.

Furthermore, the present invention is characterized in that the solution of said k-th degree polynomial equation is obtained by repeatedly differentiating said k-th degree polynomial equation to prepare a (k−1) times differential function from a one time differential function, and calculating in sequence the solution when a value of a (k−j) times differential function becomes zero, while sequentially increasing j (where j is an integer).

BRIEF DESCRIPTION OF DRAWINGS

FIG. 11A is a diagram exemplifying a response waveform from a multi-branched optical line to be analyzed in the multi-branched optical line testing apparatus which is a prerequisite of the present invention; and FIG. 11B is a diagram exemplifying a response waveform from a multi-branched optical line to be analyzed in the multi-branched optical line testing apparatus which is a prerequisite of the present invention.

DESCRIPTION OF THE PREFERRED EMBODIMENT

Before describing the present invention, the technology which is the background and the prerequisite of the present invention will first be described.

Figure 9:
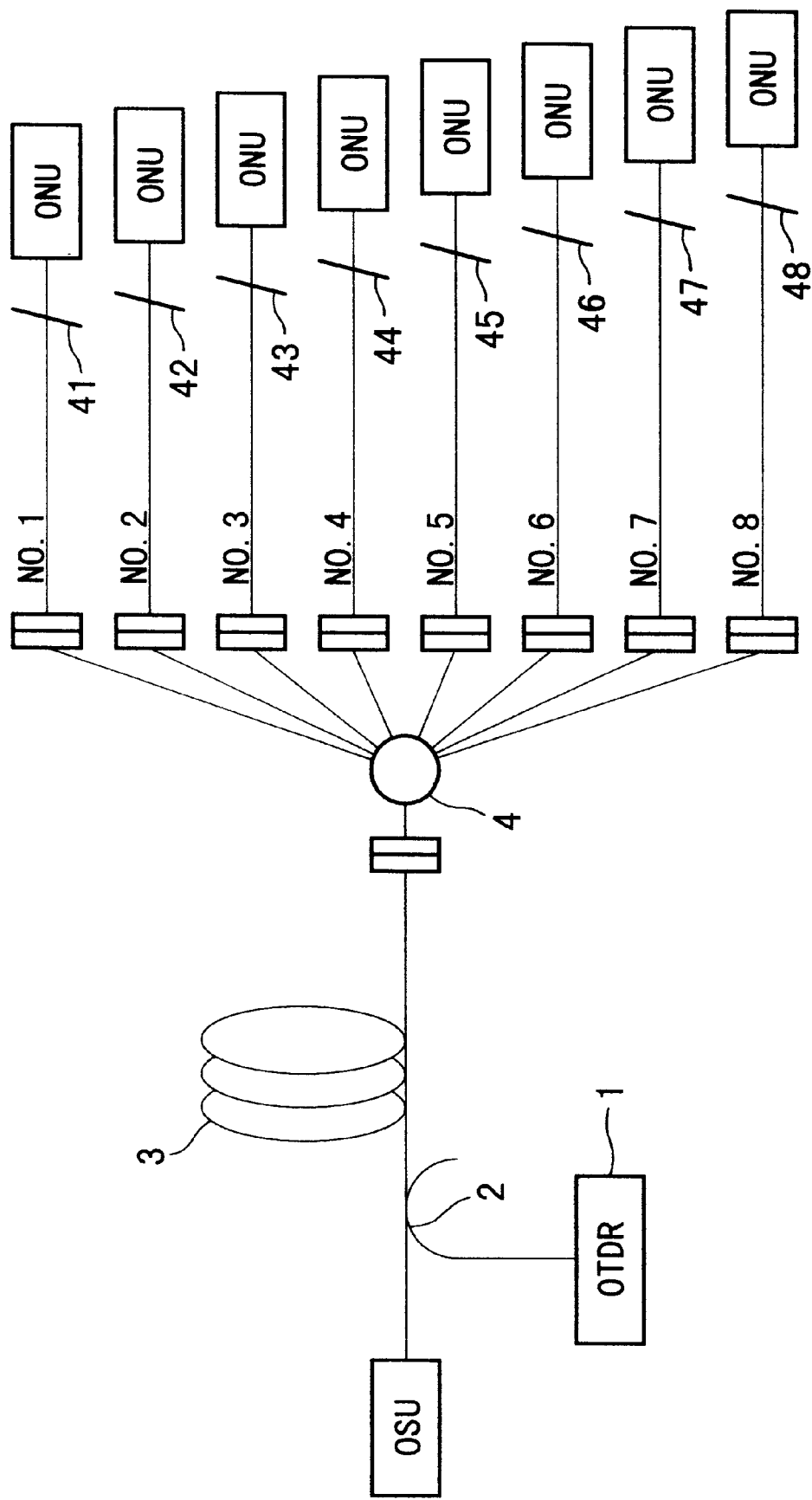
FIG. 9 is a structure diagram of a multi-branched optical line testing apparatus which is a prerequisite of the present invention.

FIG. 9 shows a structure of a multi-branched optical line testing apparatus which is a prerequisite of the present invention. This multi-branched optical line testing apparatus is for carrying out a test of cutting and dividing a fault in an 8-branched type optical line provided in a 1.31/1.55 $\mu$m wave length multi-transfer system. In this figure, a test light (1 $\mu$m band) from an OTDR Optical Time Domain Reflectometer measuring apparatus 1 is projected into an optical line 3 via a coupler 2, and after being branched by a star coupler 4, is distributed to optical fibers No. 1~No. 8. Filters 41~48 are respectively provided at locations ahead of an ONU (Optical Network Unit; an optical subscriber network unit) of these respective optical fibers No. 1~No. 8. These filters 41~48 have a band pass property that only an optical signal to each ONU is passed and a test light is reflected. Hence, each test light passing through the optical fibers No. 1~No. 8 is reflected by these filters 41~48, and a reflected light from each filter is returned to the optical filters No. 1~No. 8. These reflected lights then pass through the star coupler 4 to be mixed, and to be returned to the OTDR measuring apparatus 1 via the coupler 2, as a response light. The response light returned as described above is analyzed by the OTDR measuring apparatus 1.

Figure 10:
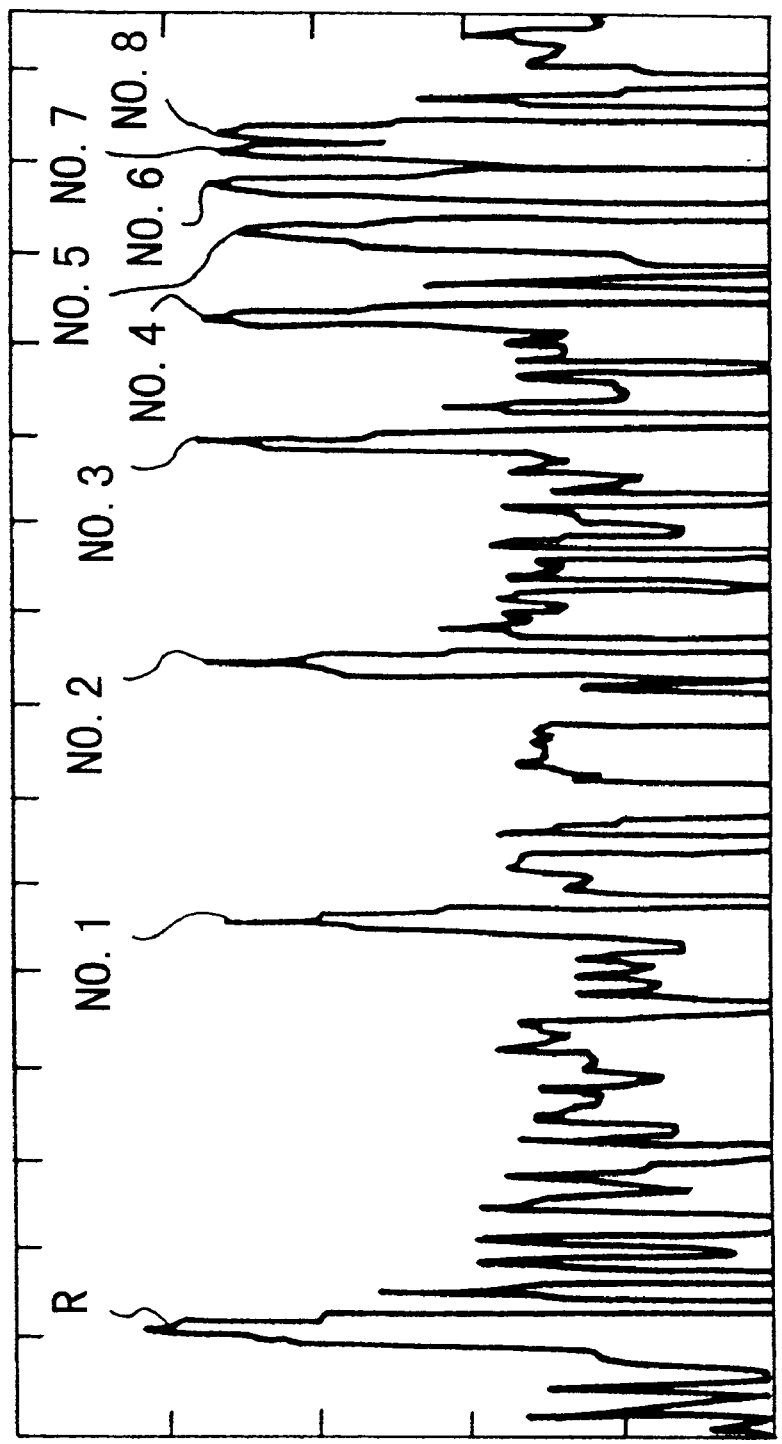
FIG. 10 is a diagram exemplifying a response waveform from a multi-branched optical line to be analyzed in the multi-branched optical line testing apparatus which is a prerequisite of the present invention.

In FIG. 10, there is shown a waveform of the response light returned to the OTDR measuring apparatus 1. This waveform is obtained by recording in time series the response light returned thereto via the coupler 2. In FIG. 10, the waveform is expressed along the horizontal axis obtained by multiplying the time axis by the transfer rate of the light (i.e., the length of the optical fiber along which the response light was propagated). Here, the response light is a mixed light of reflected light from each filter 41~48, and these filters are arranged at positions where the distances from the OTDR measuring apparatus 1 is different. Hence, the reflected lights from each filter 41~48 observed by the OTDR measuring apparatus 1 are not overlapped on each other on the time axis, and each reflected light is observed separately. In FIG. 10, there are shown the waveforms of reflected lights returned to the OTDR measuring apparatus 1 via the optical fibers No. 1~No. 8, in order from a waveform R shown farthest to the left, which is the reflected light from the star coupler, toward the right.

FIGS. 11A and B show, in an enlarged scale, waveforms of each reflected light returned via the optical fibers No. 6~No. 8, of the reflected lights observed by the OTDR measuring apparatus 1. FIG. 11A shows a case where there is no fault in any optical fiber, and FIG. 11B show a case where a fault is simulated by adding a bending loss of 3 dB to the optical fiber No. 7. As shown in these figures, with respect to the optical fiber No. 7, it is seen that the strength of the reflected light is decreased due to the simulation of a fault.

As described above, according to the structure shown in FIG. 9, it is possible to detect a fault caused in the optical line by, analyzing the strength of each reflected light of the response lights returned to the OTDR measuring apparatus 1. This technique is disclosed in a paper B-846, "A test technique of cutting and dividing faults in the 1.6 $\mu$m band of a branch sentence optical line", presented at the autumn meeting of 1994 Electronic Information Communication Academy.

While, the above-mentioned multi-branched optical line testing apparatus which is the prerequisite of the present invention can detect a fault in an optical line, it cannot detect in which position the fault exists in the faulty line. Furthermore, with the multi-branched optical line testing apparatus which is the prerequisite of the present invention, since each of the reflected lights observed using the OTDR measuring apparatus 1 must not be overlapped on each other on the time axis, the arrangement position of each filter must be determined so that the distances from the coupler differ mutually. To that end, the optical fiber must be reasonably long. Using such a long optical fiber however, makes the cost of the transfer system very high, making it difficult to make this practicable.

One embodiment of the present invention will now be described with reference to the accompanying drawings.

Figure 1:
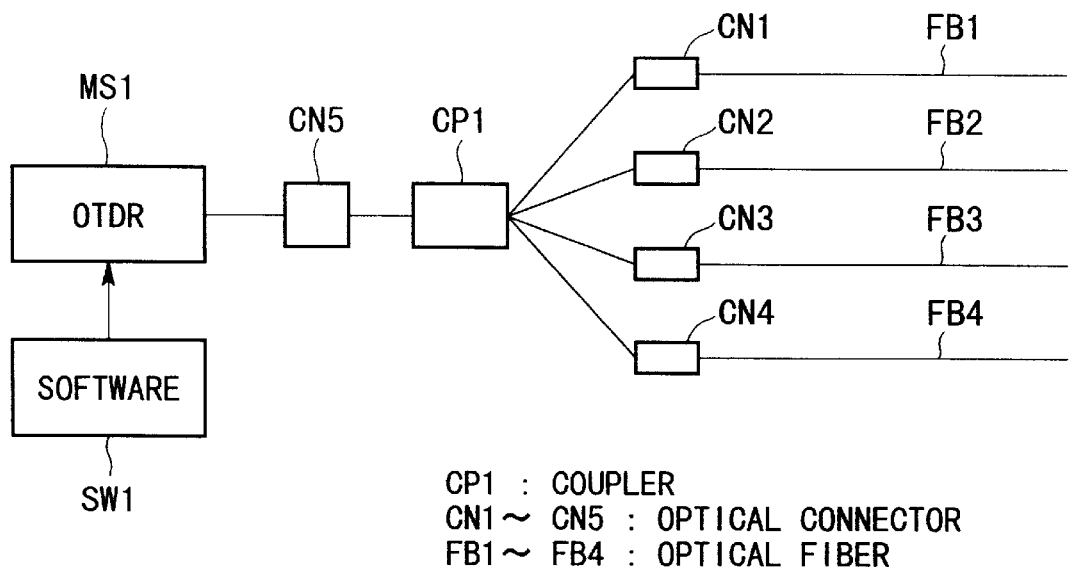
FIG. 1 is a structure diagram of a multi-branched optical line testing apparatus which is one embodiment of the present invention.

FIG. 1 is a block diagram showing a structure of a multi-branched optical line testing apparatus, being one embodiment of the present invention. Referring to FIG. 1, MS1 denotes an OTDR measuring apparatus, SW1 denotes software for performing data analysis, CN1~CN5 denote optical connectors, CP1 denotes a coupler, and FB1~FB4 denote respective optical fibers. In this figure, the optical fibers FB1~FB4 connected to the coupler CP1 form a part of an optical network, and these optical fibers are the objects to be tested in this embodiment. Furthermore, the OTDR measuring apparatus MS1 connected to these objects to be tested via the coupler CP1, and the software SW1 executed by this OTDR measuring apparatus MS1 constitute the multi-branched optical line testing apparatus according to this embodiment.

Figure 2:
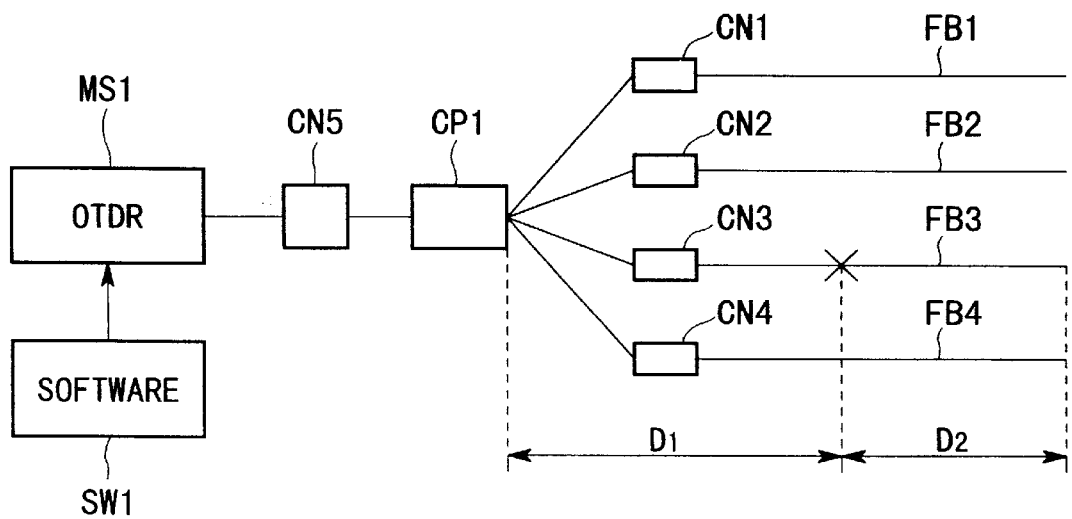
FIG. 2 is a diagram for explaining the function of the embodiment.

FIG. 2 is for explaining the function of the multi-branched optical line testing apparatus according to this embodiment. That is, for example, in the case where a fault occurs in the optical fiber FB3, this multi-branched optical line testing apparatus detects that the optical fiber FB3 is a faulty line, as well as determining the distance d1 and d2 to specify the fault point (X mark) on this optical fiber FB3. The detection of this faulty line and the specification of the fault point are performed by the execution of the software SW1 by the OTDR measuring apparatus MS1.

Figure 3:
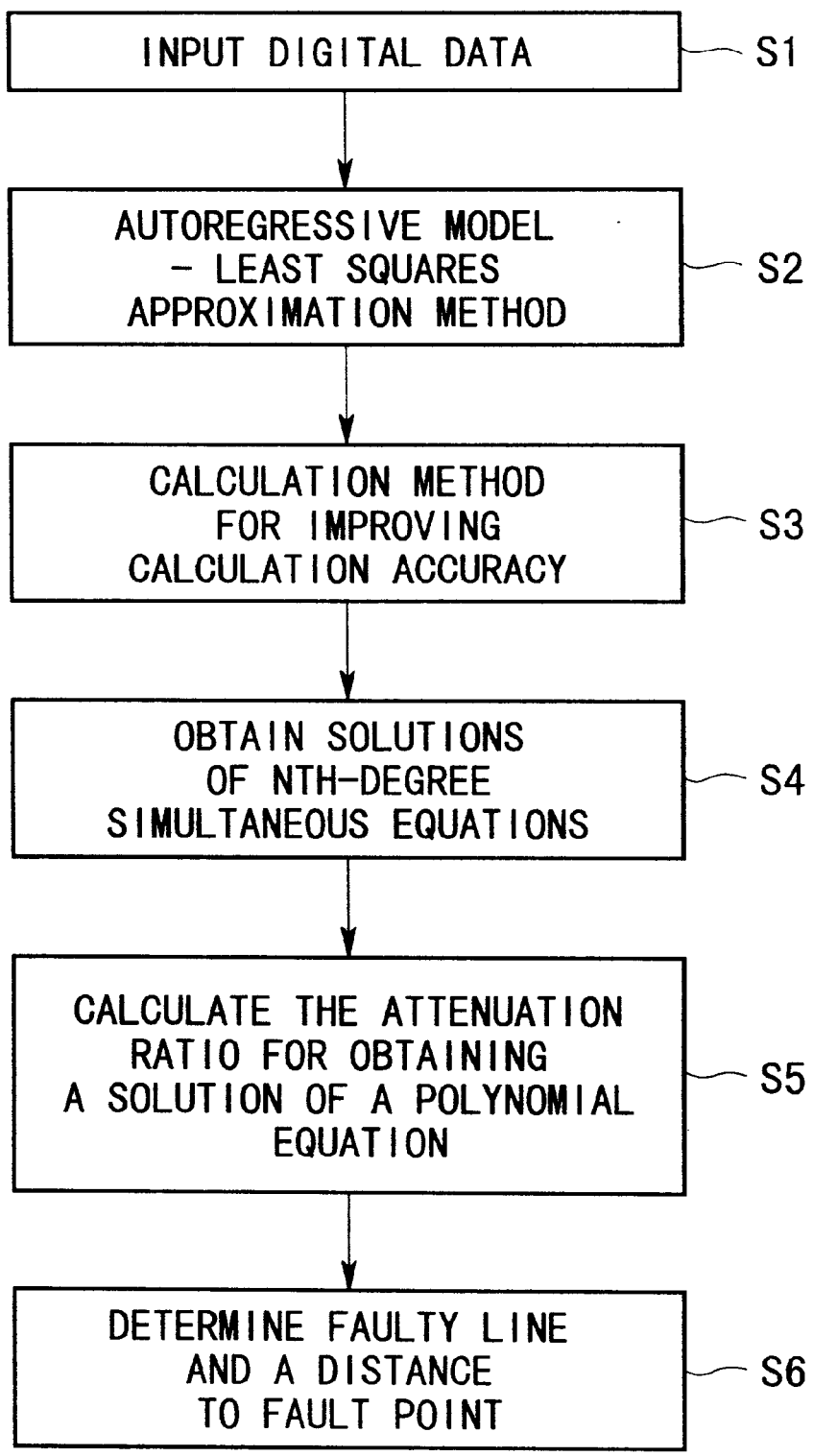
FIG. 3 is a flow chart showing the operation of the embodiment.

FIG. 3 shows a flow for the software SW1 executed by the OTDR measuring apparatus MS1. The operation of this embodiment will be described hereunder with reference to this flow. First, prior to the operation of the testing apparatus, each of the optical fibers FB1~FB4 shown in FIG. 1 are connected in advance to the coupler CP1, and the attenuation ratio r1~r4 of each optical fiber is measured using the OTDR measuring apparatus MS1 (the meaning of the attenuation ratio will be described later). Then after the operation of the optical network is started, the following (1)~(6) processing is performed regularly using this testing apparatus.

(1) Digital Data Input Processing (Step S1)

In this processing, the OTDR measuring apparatus MS1 first projects an optical pulse (test light). This optical pulse is divided into four by passing through the coupler CP1 and projected into the optical fibers FB1~FB4, respectively. Backscattering lights are then produced during the stage where each optical pulse propagates through each optical fiber FB1~FB4. These backscattering lights are returned to each optical fiber FB1~FB4, mixed by the coupler CP1, and returned to the OTDR measuring apparatus MS1 as response light. This response light is converted to an electric signal (analog signal) corresponding to the level in the OTDR measuring apparatus MS1, and this analog signal is converted to digital waveform data (time series sample data) and stored in a memory.

Figures 4, 5:
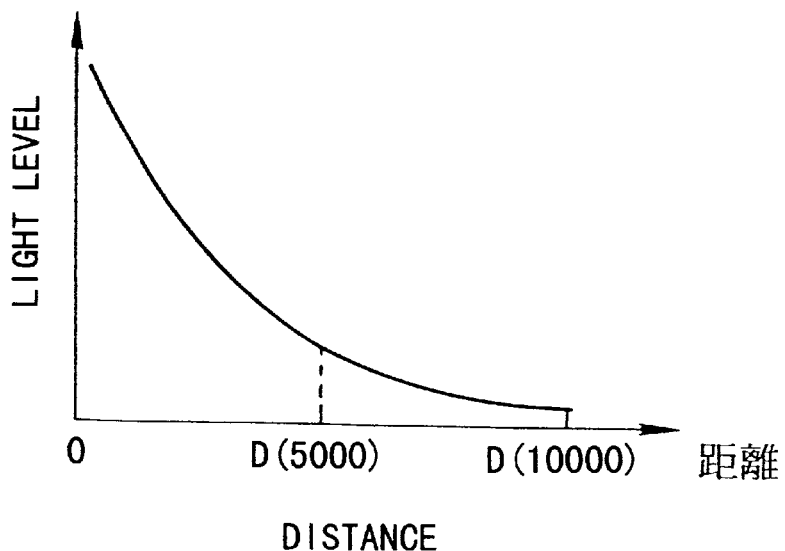
FIG. 4 is a diagram showing digital waveform data obtained in the embodiment.
FIG. 5 is a diagram showing the number of digits required in the computation carried out in the embodiment.

FIG. 4 exemplifies the digital waveform data stored in the memory as described above. In this FIG. 4, the horizontal axis is expressed as distance. Each digital waveform data is obtained by sampling the strength of the response light described above with a certain sampling cycle interval. This sampling cycle corresponds to 1 m, when expressed as distance. Therefore, the digital waveform data for 10000 points expresses the response waveform which is mixed with the reflected lights from each portion of an optical fiber having a length of 10 Km. The vertical axis in FIG. 4 shows the level of the response light which is mixed with the backscattering lights from the optical fibers FB1~FB4.

(2) Processing for Creating Simultaneous Equations by Means of the Autoregressive Model and the Least Squares Approximation Method (Step S2)

The response light reaching the OTDR measuring apparatus MS1 contains each reflected light from each optical fiber FB1~FB4. With this embodiment, faults in each optical fiber are detected based on these reflected lights. However, in order to specify the optical fiber having the fault, it is necessary to mutually separate and detect the change in each reflected light from each optical fiber. With this embodiment, detection of the change in each mutually separated reflected light is performed according to the following way of thinking.

First, it is assumed that backscattering lights having a power of $A_1$~$A_4$ are respectively generated at each point on each optical fiber FB1~FB4 separated from the OTDR measuring apparatus MS1 by a distance d, and these backscattering lights are returned through the optical fibers FB1~FB4 and received by the OTDR measuring apparatus MS1. If the optical power received by the OTDR measuring apparatus MS1 at this time is designated as x, this optical power x is theoretically expressed by the following expression:

$$x = A_1 e^{-d/r1} + A_2 e^{-d/r2} + A_3 e^{-d/r3} + A_4 e^{-d/r4} \quad (1)$$

where in the above expression (1), r1, r2, r3 and r4 are respective attenuation constants of each optical fiber FB1~FB4.

This is applied to the digital waveform data obtained in the above step S1. That is, first the number of the digital waveform data taken into the memory in step S1 is designated as n (for example, n=10000), and a distance resolution, that is, the distance obtained by multiplying the sample cycle between adjacent two digital waveform data by the transfer rate of the light is designated as D. In this case, it is considered that the digital waveform data $X_n$ which is ultimately taken into the memory, expresses the optical power of the response light when each backscattering light generated at each point separated from the OTDR measuring apparatus MS1 by the distance d=nD is returned to the OTDR measuring apparatus MS1 via the optical fibers FB1~FB4. Therefore, by making d=nD in the above expression (1), the n-th digital waveform data $X_n$ can be expressed by the strength of the backscattering light from each optical fiber.

$$X_n = A_1 e^{-nD/r1} + A_2 e^{-nD/r2} + A_3 e^{-nD/r3} + A_4 e^{-nD/r4} \quad (2)$$

Furthermore, the digital waveform data $x_{n-1}$ one point before this digital waveform data $x_n$ can be considered to correspond to the backscattering light generated at a distance D which is closer to the OTDR measuring apparatus MS1 than the above-mentioned backscattering light, and can be expressed by the following expression:

$$x_{n-1} = A_1' e^{-(n-1)D/r1} + A_2' e^{-(n-1)D/r2} + A_3' e^{-(n-1)D/r3} + A_4' e^{-(n-1)D/r4} \quad (2)'$$

However, it is considered that there is a strong autocorrelation between $x_n$ and $x_{(n-1)}$. Moreover, this can apply to the continuous digital waveform data x in general, and it can be considered that there is autocorrelation between each data.

Therefore, this autocorrelation is made a prerequisite, and it is also a prerequisite that values of each attenuation constant r1~r4 are different in principle. Separation analysis is then performed using the digital waveform data $x_k$ (k=1~n) of n=10000 to determine each attenuation ratio r1, r2, r3 and r4.

First, assuming that there is autocorrelation between the digital waveform data $x_k$ (k=1~10000), the autoregressive model method is applied to obtain the following simultaneous equations related to each digital waveform data:

$$x_5 = a_1 \cdot x_4 + a_2 \cdot x_3 + a_3 \cdot x_2 + a_4 \cdot x_1 \quad (3)$$
$$x_6 = a_1 \cdot x_5 + a_2 \cdot x_4 + a_3 \cdot x_3 + a_4 \cdot x_2$$
$$x_7 = a_1 \cdot x_6 + a_2 \cdot x_5 + a_3 \cdot x_4 + a_4 \cdot x_3$$
$$x_8 = a_1 \cdot x_7 + a_2 \cdot x_6 + a_3 \cdot x_5 + a_4 \cdot x_4$$
$$\vdots$$
$$x_{19999} = a_1 \cdot x_{9998} + a_2 \cdot x_{9997} + a_3 \cdot x_{9996} + a_4 \cdot x_{9995}$$
$$x_{10000} = a_1 \cdot x_{9999} + a_2 \cdot x_{9998} + a_3 \cdot x_{9997} + a_4 \cdot x_{9996}$$

In the above equations (3), the constants $a_1, a_2, a_3, a_4$ are referred to as the autoregressive constants. The constants $a_1, a_2, a_3$ and $a_4$ are determined by solving the above simultaneous equations (3). If the following equation using these constants is solved, the attenuation ratios r1, r2, r3 and r4 can be found.

$$1 - a_1 X - a_2 X^2 - a_3 X^3 - a_4 X^4 = 0 \quad (4)$$

If it is assumed that there are four solutions X in this equation, these solutions are equal to $e^{1/r1}$, $e^{1/r2}$, $e^{1/r3}$ and $e^{1/r4}$, respectively. Thus, if the digital waveform data x(k) (k=1~10000) is used, the attenuation ratios r1, r2, r3 and r4 of each optical fiber can be found.

Since the digital waveform data $x_k$ (k=1~n) includes errors, simple calculation is the above constants $a_1, a_2, a_3, a_4$.

First, if the least squares approximation method is applied to the simultaneous equations (3) (9995 equation in total), the following four simultaneous equations can be obtained.

$$a_1 \Sigma(x_{4+j})^2 + a_2 \Sigma x_{3+j} x_{4+j} + a_3 \Sigma x_{2+j} x_{4+j} + a_4 \Sigma x_{1+j} x_{4+j} = \quad (5)$$
$$\Sigma x_{5+j} x_{4+j}$$
$$a_1 \Sigma x_{4+j} x_{3+j} + a_2 \Sigma(x_{3+j})^2 + a_3 \Sigma x_{2+j} x_{3+j} + a_4 \Sigma x_{1+j} x_{3+j} =$$
$$\Sigma x_{5+j} x_{3+j}$$
$$a_1 \Sigma x_{4+j} x_{2+j} + a_2 \Sigma x_{3+j} x_{2+j} + a_3 \Sigma(x_{2+j})^2 + a_4 \Sigma x_{1+j} x_{2+j} =$$
$$\Sigma x_{5+j} x_{2+j}$$
$$a_1 \Sigma x_{4+j} x_{1+j} + a_2 \Sigma x_{3+j} x_{1+j} + a_3 \Sigma x_{2+j} x_{1+j} + a_4 \Sigma(x_{1+j})^2 =$$
$$\Sigma x_{5+j} x_{1+j}$$

where, in the above equation (5), $\Sigma$ is an operator which means the sum total of j=0~9995.

If this equation (5) is solved, $a_1, a_2, a_3$ and $a_4$ can be determined. If the above equation (4) is solved using these $a_1, a_2, a_3$ and $a_4$, the attenuation ratios r1~r4 can be obtained.

(3) Execution of a Calculation Method for Improving the Calculation Accuracy (Step S3)

When the number of digits required is large, the calculation method needs to be further improved, and hence this step S3 needs to be performed.

First, the number of digits required at the time of computation using the value of the attenuation ratio r is as shown in FIG. 5. Here, the case is considered where an optical fiber having a loss factor of 0.35 dB/Km is measured with a resolution of 1 m, using, for example, an OTDR measuring apparatus. In this case, by solving the following equation $$(0.35 \text{ dB}/1000 \text{ m}) \cdot 1 \text{ m} = 10 \cdot \log(e^{-1/r}) \quad (6)$$

with respect to r, r=12408 can be obtained. Then according to FIG. 5, this attenuation ratio r requires 28 digits or more.

If a computation using such a large number of digits is to be performed, a large burden will be imposed on the software.

To improve the calculation accuracy, D should be large. However, if D is made large, the distance resolution becomes too large. Therefore, the following calculation value D' may be used instead of the data value D.

$$D' = D \cdot N/5 \quad (7)$$

The calculation method using this D' will be explained with reference to an example.

First, when a calculation is done using 30 pieces of data, the calculation using the least squares approximation method uses the following parts of the above equations (3).

$$x_5 = a_1 x_4 + a_2 x_3 + a_3 x_2 + a_4 x_1 \quad (8)$$
$$x_6 = a_1 x_5 + a_2 x_4 + a_3 x_3 + a_4 x_2$$
$$\vdots$$
$$x_P = a_1 x_{P-1} + a_2 x_{P-2} + a_3 x_{P-3} + a_4 x_{P-4}$$
$$\vdots$$
$$x_{30} = a_1 x_{29} + a_2 x_{28} + a_3 x_{27} + a_4 x_{26}$$

However, with this improved calculation method, the autocorrelation is assumed with respect to the digital waveform data x arranged at 10-data intervals, and not with respect to such continuous x, and the following simultaneous equations are set up.

$$x_{41} = a_1' x_{31} + a_2' x_{21} + a_3' x_{11} + a_4' x_1$$
$$x_{42} = a_1' x_{32} + a_2' x_{22} + a_3' x_{12} + a_4' x_2 \quad (9)$$

Here, $a_1, a_2, \ldots$ are calculated for each data, while $a_1', a_2', \ldots$ are calculated for each 10 data. Hence, $D/r_1'$, $D/r_2'$ values become 10 times as large as $D/r_1$, $D/r_2$ values. According to this method, the accuracy can be improved compared to the case where the simultaneous equations were found by the above step S2.

(4) Process for Solving an nth Degree Simultaneous Equation (Step S4)

With this step S4, the simultaneous equations obtained in the above-mentioned step S2 or S3 are solved to obtain the constants $a_1, a_2, \ldots$ or $a_1', a_2', \ldots$.

(5) Process for Solving a Polynomial Equation to Determine the Attenuation Ratio (Step S5)

With this step S5, the above equation (4) is prepared using the constants $a_1, a_2, \ldots$ or $a_1', a_2', \ldots$ obtained in the above step S4, and this equation is solved to obtain the attenuation ratio.

Figure 6:
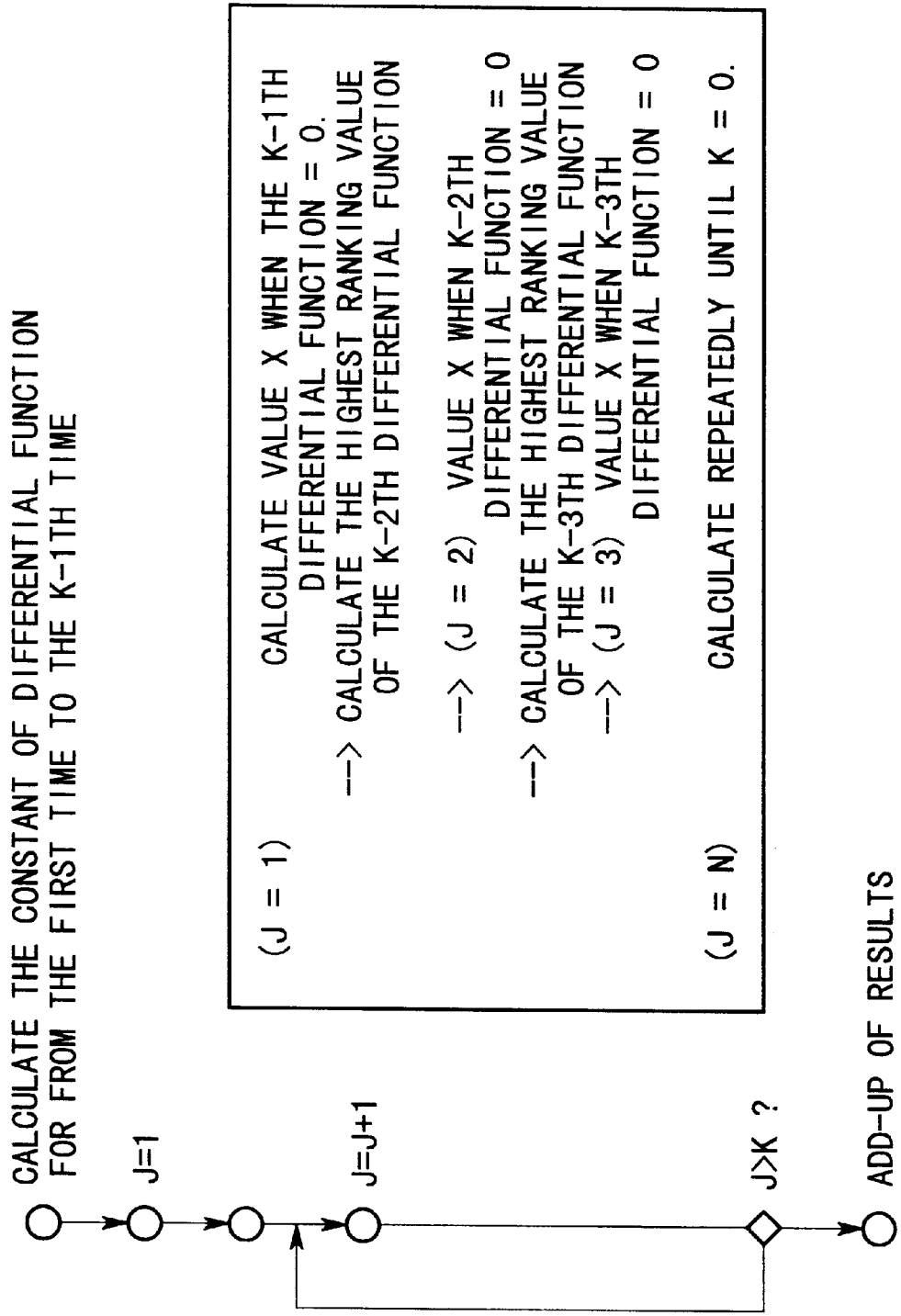
FIG. 6 is a diagram showing a method of solving the k-th degree polynomial equation in the embodiment.

With this embodiment, since there are four optical fibers, the polynomial of equation (4) becomes a biquadratic equation. However, when there are 8 or 16 optical fibers, equation (4) will become an 8th-degree equation and a 16th-degree equation, respectively. FIG. 6 represents a general solution for solving a kth-degree equation, assuming that equation (4) is a kth-degree equation. With this method, the kth-degree polynomial equation is repeatedly differentiated to prepare each differential function from the first differential function to the k–1th differential function. Then while increasing j in sequence (where j is an integer), the solution when the value of the k–jth differential function becomes 0 is calculated in sequence, thereby obtaining the solution of the kth-degree polynomial equation. That is, first the value of k–1th differential function is designated as 0, and this is solved with respect to X, and the solution, that is, the highest ranking value of the k–2th differential function is obtained. Then, the value of the k–2th differential function is designated as 0, and this is solved with respect to X, and the solution, that is, the highest ranking value of the k−3th differential function is obtained. This process is repeated to obtain the highest ranking value of each differential function, hence all the solutions of the kth-degree equation are obtained. The number of solutions of the kth-degree equation obtained as described above depends on the degree of the equations. In the case of a biquadratic polynomial equation such as equation (4), the number of the solutions X becomes 4, 3, 2, 1 or 0.

If equation (4) is solved according to the above method, $D=e^{D/r}$ can be obtained as a solution. Hence, the attenuation ratio r can be obtained by the following computation.

$$D/r = \log X \quad (10)$$

Provided that, when a calculation method for improving the calculation accuracy of step S3 is performed, since $D'/r=(D/r)\cdot N/5$, the attenuation ratio r is obtained according to the following equation.

$$D/r = (5/N) \log X \quad (11)$$

The solutions of equation (4) are obtained as described above, and from these solutions, respective attenuation ratios of the four optical fibers can be obtained.

(6) Discrimination of a Faulty Line (Step S6)

The calculation method for the attenuation ratio r of each optical fiber has been described, and in each step described above, the Fresnel reflection point is detected from the response waveform returned to the OTDR measuring apparatus MS1 (that is, the waveform determined based on the digital waveform data stored in the memory), and the computation of the attenuation ratio of each optical fiber described above is carried out, by designating the interval from the head of the response waveform to the first Fresnel reflection point, and each range between each Fresnel reflection point after that, as the analysis range. Then in this step S6, based on the thus obtained attenuation ratio, a faulty line and the position of a fault point are detected, as follows.

Figure 7:
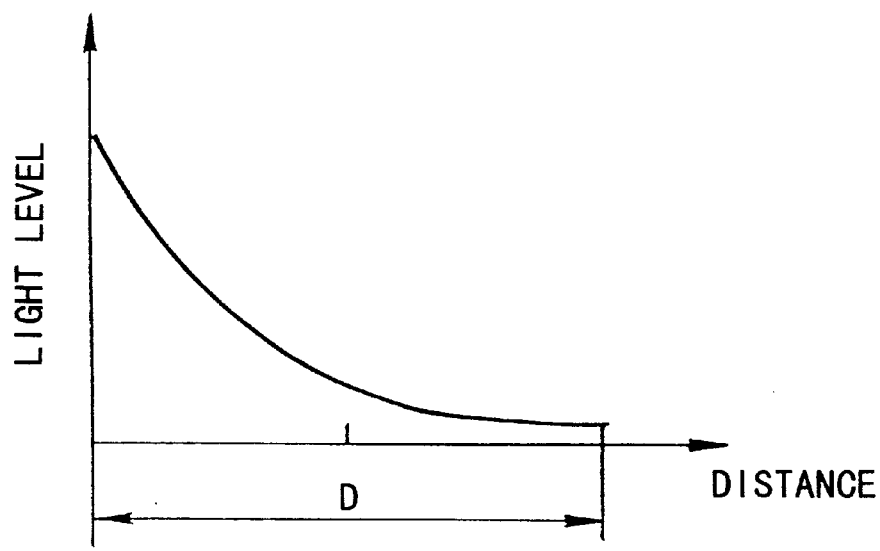
FIG. 7 is a diagram for explaining a detection operation of a faulty line in the embodiment.

First, when there is no fault in each optical fiber FB1~FB4 as shown in FIG. 1, the response waveform having no Fresnel reflection point is obtained, as shown in FIG. 7. Therefore, in this case, the whole response waveform determined based on the digital waveform data stored in the memory becomes one analysis range. When a computation of the attenuation ratio is carried out according to the above-mentioned procedure with respect to this analysis range, the attenuation ratios r1, r2, r3, r4 of each optical fiber FB1~FB4 are obtained.

Figure 8:
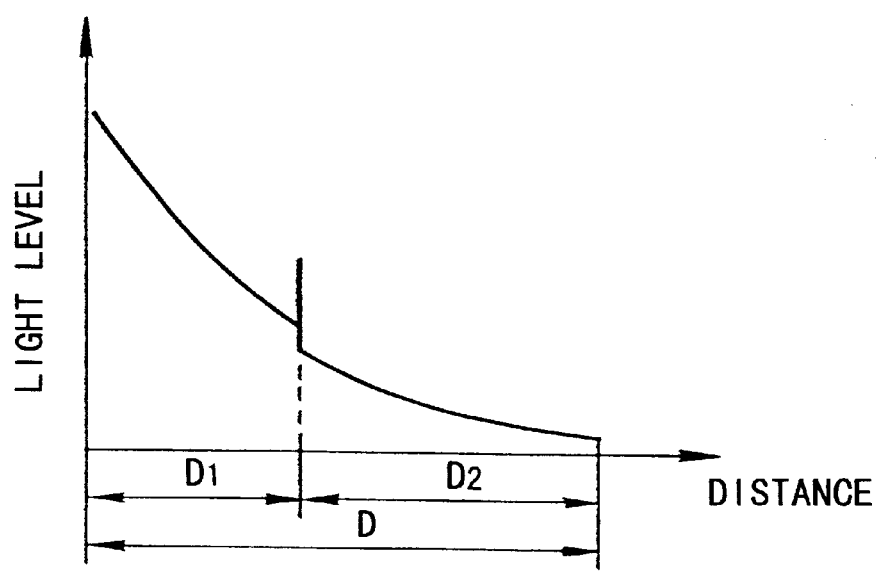
FIG. 8 is a diagram for explaining a detection operation of a faulty line in the embodiment.

On the other hand, when a fault is caused in one optical fiber as shown in FIG. 2, a Fresnel reflection point appears at a position of distance d1, as shown in FIG. 8, and the whole interval d is divided into the first half interval (distance d1) and the second half interval (distance d2). In this case, both computations for obtaining the attenuation ratio of each optical fiber, designating the first half interval as the analysis range, and designating the second half interval as the analysis range are carried out. As a result, the attenuation ratios r1, r2, r3 and r4 are obtained as the computation result corresponding to the first half interval, and the attenuation ratios r1, r2, and r4 are obtained as the computation result corresponding to the second half interval. Comparing the both computation results, it becomes clear that the attenuation ratio corresponding to the optical fiber FB3 is lacking, hence it is seen that the optical fiber FB has a fault, and that the fault point is at a position of distance d1.

We claim:

1. A multi-branched optical line testing apparatus which introduces an optical pulse into a branch point of a multi-branched optical line, wherein the optical pulse is advanced from said branch point to a plurality of optical lines and reflected in these optical lines and returned via said branch point, wherein the testing apparatus analyzes a waveform of response light due to Rayleigh scattering to thereby detect a fault in each optical line, and determine a fault point, wherein said response light which is returned via said branch point for each predetermined period of time is converted to a digital waveform data group, an attenuation ratio of each optical line is calculated by performing separation analysis of said digital waveform data group, and a faulty line and position of the fault point are determined based on the change of the attenuation ratio.

2. A multi-branched optical line testing apparatus which introduces an optical pulse into a branch point of a multi-branched optical line, wherein the optical pulse is advanced from said branch point to a plurality of optical lines and reflected in these optical lines and returned via said branch point, wherein the testing apparatus analyzes a waveform of response light to thereby detect a fault in each optical line, and determine a fault point, wherein said response light which is returned via said branch point for each predetermined period of time is converted to a digital waveform data group, an equation group is prepared, wherein the equation group comprises terms obtained by multiplying each data constituting said digital waveform data group by autoregressive coefficients corresponding to simultaneous equations patterning the autocorrelation relationship between each data, and wherein each autoregressive coefficient is calculated by solving these simultaneous equations using a least squares approximation method, an attenuation ratio of each optical line connected to said branch point is calculated based on the autoregressive coefficients, and a faulty line and position of the fault point are determined based on the change of the attenuation ratio.

3. A multi-branched optical line testing apparatus according to claim 2 wherein when the number of optical fibers connected to said branch point is designated as k, said digital waveform data group is divided into (k+1) equal parts, and simultaneous equations corresponding to a large attenuation of N/(k+1) times are set up.

4. A multi-branched optical line testing apparatus according to claim 2 or claim 3, wherein said attenuation ratio is calculated by solving the k-th degree polynomial equation designating said each autoregressive coefficient as a coefficient of each term.

5. A multi-branched optical line testing apparatus according to claim 4, wherein the solution of k-th degree polynomial equation is obtained by repeatedly differentiating said k-th degree polynomial equation to prepare a (k−1) times differential function from a one time differential function, and calculating in sequence the solution when a value of a (k−j) times differential function becomes zero, while sequentially increasing j, where j is an integer.

* * * * *